B. R. KOERING.
FILTER TANK.
APPLICATION FILED DEC. 22, 1915.
1,225,441.
Patented May 8, 1917.
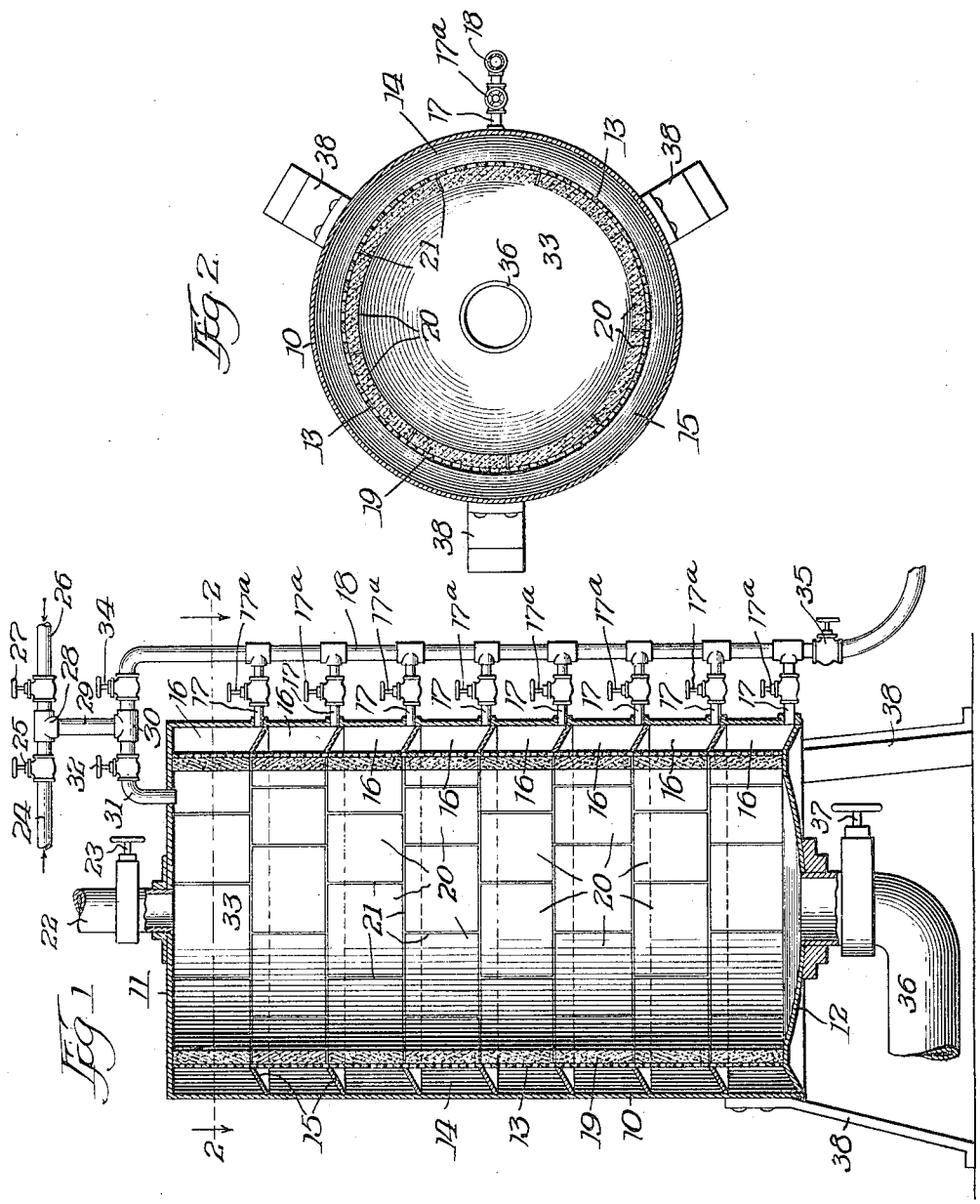

UNITED STATES PATENT OFFICE.

BRUNO RICHARD KOERING, OF DETROIT, MICHIGAN.

FILTER-TANK.

1,225,441. Specification of Letters Patent. Patented May 8, 1917.

Application filed December 22, 1915. Serial No. 68,155.

*To all whom it may concern:*

Be it known that I, BRUNO R. KOERING, a citizen of the United States, residing at Detroit in the county of Wayne and State of Michigan, have invented certain new and useful Improvements in Filter-Tanks, of which the following is a specification.

My invention relates to filter tanks, and refers particularly, although not exclusively, to filter tanks of relatively large size adapted to handle large quantities of solution containing solid impurities which are to be removed therefrom.

My invention is particularly useful in connection with the filtration of liquids which contain metal, such as gold, silver, copper, or the like, in solution, and is adapted to be operated so that the solid material which is filtered from the solution may be successively washed in order to remove therefrom all traces of metal-bearing solution.

Stated in general terms, my invention consists of a closed tank, which is divided vertically into a receiving chamber and a filtrate chamber, the tank being preferably of cylindrical form, with the receiving chamber centrally located within and surrounded by the filtrate chamber. The latter is divided into a plurality of compartments, one located above the other, and from each of which there is a closable outlet, all of these outlets in turn preferably communicating with a single solution discharge pipe. When a solution carrying solid impurities therein is introduced into the receiving chamber and is then subjected to the pressure of a gas introduced into the upper portion of this chamber, the solution is forced through the filtering medium into the compartments of the filtrate chamber. As the level of solution within the receiving chamber becomes lower, the outlets from the filtrate compartments are successively closed so that only the outlets from the compartments which are located below the level of solution within the receiving chamber are allowed to remain open, thus preventing the gas under pressure from having a direct path of escape through any of the outlets. It will thus be evident that all of the solution contained within the filter tank may be filtered under pressure, and after the original solution has been filtered solid impurities remaining in the receiving chamber may be washed free from the original solution by filling the receiving chamber, either wholly or partially, with wash water, and repeating the operation above described.

These and other advantages of my invention will be more readily understood by reference to the accompanying drawings, in which—

Figure 1 is a vertical section through my improved filter tank, and

Fig. 2 is a horizontal section taken on the line 2—2 of Fig. 1.

The filter tank has an outer metallic shell 10, preferably cylindrical in shape and provided with a top 11 and a bottom 12. Spaced inwardly from the outer shell 10 is the inner perforated metallic shell 13, which is of similar shape to the outer shell 10, so that between the outer and inner shells 10 and 13, respectively, an annular filtrate chamber 14 is formed. The filtrate chamber 14 is provided with a plurality of horizontally disposed partitions 15, which slope downwardly from their inner edges which engage the inner shell 13 to their outer edges which engage the outer shell 10. The filtrate chamber 14 is thus divided into a plurality of filtrate compartments 16 located one above the other. An outlet pipe 17 extends from the lowermost portion of each filtrate compartment 16 to a common discharge pipe 18, each of the outlet pipes 17 being provided with a valve 17ª.

Located just inside of the perforated inner shell 13 is the filtering medium 19, which preferably consists of a plurality of curved plates 20, of porous ceramic material, such as filtrose. Between the edges of these plates may be placed strips of wood 21 which will expand when wet, thus forming tight joints between the plates 20. I prefer to use bass-wood for this purpose. It will be apparent that any suitable cement may also be used between the edges of the plates in order to form tight joints without departing from the spirit of my invention.

The top 11 of the filter tank is provided with the solution inlet pipe 22 having therein the valve 23.

The pipe 24 having therein the valve 25 is connected with a suitable source of compressed air, and the pipe 26 having therein the valve 27 is connected with a suitable source of water, or other liquid, to be used for washing purposes. The pipes 24 and 26 each connect with the T-coupling 28 from which the pipe 29 leads to the T-coupling 30. From the latter the pipe 31 having therein the valve 32 extends through the top 11 of the filter tank into the receiving chamber 33 formed within the filtering medium 19. The pipe 18 having therein the valve 34 is also connected with the T-coupling 30. The pipe 18 also has the valve 35 located below the lowermost outlet pipe 17 leading from the lowermost filtrate compartment 16.

The bottom 12 of the filter tank is preferably disk-shaped, and is provided with the relatively large outlet pipe 36 which is controlled by the valve 37. The filter tank as a whole may be supported on the legs 38, or by any other appropriate means.

Having thus described the construction of my improved filter tank, its operation may now be readily understood:

The valve 37 being closed, liquid to be filtered, as, for example, a cyanid solution containing therein solid impurities of slimes or finely divided ore, is admitted to the receiving chamber 33 through the inlet pipe 22, the valve 23 being opened for the purpose. When the receiving chamber is approximately full the valve 23 is closed. The valves 27 and 34 remaining closed, the valves 25 and 32 are now opened so that compressed air is admitted from pipe 24 through pipes 29 and 31 into the receiving chamber 33. Inasmuch as the upper surface of solution within the receiving chamber is below the highest point of the uppermost filtrate compartment 16, the valve 17$^a$ in the outlet pipe 17 leading from such compartment is closed, as otherwise the compressed air would pass directly through the filtering medium 19 and the perforated inner shell 13 to the pipe 18. All of the other valves 17$^a$ in the outlet pipes 17 of the filtrate compartments 16 below the uppermost compartment are opened, and since the compressed air cannot escape directly into the pipe 18 its pressure is exerted on the surface of the liquid within the receiving chamber 33, thereby forcing the latter through the filtering medium 19 into the filtrate compartments 16 from which the filtrate passes to the discharge pipe 18 through the outlet pipes 17. When the surface of the solution within the receiving chamber 33 successively reaches the uppermost parts of the various filtrate compartments 16, the valves 17 in the outlet pipes of such compartments are successively closed, thereby preventing the compressed air from immediately forcing the filtrate which has accumulated in such compartments through the outlet pipes of the same, and allowing the compressed air to pass directly to the pipe 18 without performing its proper function.

After the level of solution within the receiving chamber 33 has fallen to the lowermost filtrate compartment 16, all of the valves 17$^a$ are opened in order to drain from these compartments any filtrate which may have accumulated in them after the valves in their respective outlets were closed. The valve 25 is now closed and the valve 27 is opened, thereby admitting water from the pipe 26 through the pipes 29 and 31 into the receiving chamber 33. This water is mixed with the original solution remaining in the receiving chamber, and removes the latter from the ore or other solids which during the course of the preceding filtration have collected in the bottom of the receiving chamber. After the desired quantity of water has been admitted, the valve 27 is closed and the valve 25 opened, and the filtering operation again takes place in exactly the same manner as above described.

If it is desired to interrupt the flow of filtrate through the pipe 18, the valve 35 which is normally open may be closed. In order to thoroughly wash the inside of the pipe 18 the outlet pipes 17 and the filtrate compartments 16, the valves 27 and 34 may be opened, the valves 25 and 32 meanwhile remaining closed, thus causing water to flow directly through the pipe 18. In order to clean the outlet pipes 17 and the compartments 16, the valves 17$^a$ may be opened as desired.

After water has been admitted to the receiving chamber and filtered therefrom the desired number of times, the outlet valve 37 is opened, and additional water is admitted to the receiving chamber by opening the valves 27 and 32 so that all solids remaining in the receiving chamber are washed away through the discharge pipe 36. The filter tank is now ready to receive a further quantity of solution to be filtered.

If desired, the level of solution within the receiving chamber 33 may be maintained at a constant height preferably near the top of the receiving chamber by constantly admitting liquid through the inlet pipe 22, and the washing operation need take place only when a sufficient amount of solids have accumulated in the bottom of the receiving chamber so that it is no longer practicable to continue this operation. The mode of operation which I have just described is particularly useful in the filtration of liquids which contain a relatively small amount of solid impurities which are to be filtered from the liquid.

It will be apparent that many changes could be made in the detailed construction of the apparatus which I have described without departing from the spirit or scope of my invention, as defined in the appended claims.

What I claim is:

1. In a filter tank, the combination of an inclosing shell, a vertically-disposed filtering medium within said shell and dividing the interior of the latter into a receiving chamber and a filtrate chamber, means for introducing into said receiving chamber liquid to be filtered, means for introducing into said receiving chamber a gas under pressure, a horizontally-disposed partition in said filtrate chamber dividing the latter into a plurality of compartments, and a closable outlet from each of said compartments.

2. In a filter tank, the combination of an inclosing shell, a vertically-disposed filtering medium dividing the interior of said shell into a receiving chamber and a filtrate chamber, means for introducing into said receiving chamber liquid to be filtered, means for introducing into said receiving chamber a gas under pressure, a horizontally-disposed partition in said filtrate chamber dividing the latter into a plurality of compartments, said partition sloping downwardly from said filtering medium to said shell, and a closable outlet from each of said compartments at the lowermost portion thereof.

3. In a filter tank, the combination of an inclosing shell, a vertically-disposed filtering medium closed on itself and spaced inwardly from said shell, whereby a receiving chamber is formed within said filtering medium and a filtrate chamber is formed between said filtering medium and said shell, means for introducing into said receiving chamber a liquid to be filtered, means for introducing into said receiving chamber gas under pressure, a horizontally-disposed partition within said filtrate chamber dividing the latter into a plurality of compartments, and a closable outlet from each of said compartments.

4. In a filter tank, the combination of a cylindrical inclosing shell, a cylindrical and vertically-disposed filtering medium spaced inwardly from said shell whereby a receiving chamber is formed within said filtering medium and an annular filtrate chamber is formed between said filtering medium and said shell, means for introducing into said receiving chamber a liquid to be filtered, means for introducing into said receiving chamber a gas under pressure, a horizontally-disposed partition within said filtrate chamber whereby the latter is divided into upper and lower compartments, and a closable outlet from each of said compartments.

5. In a filter tank, the combination of a cylindrical inclosing shell, a vertically-disposed cylindrical filtering medium spaced inwardly from said shell, whereby a receiving chamber is formed within said filtering medium and an annular filtrate chamber is formed between said filtering medium and said shell, means for introducing into said receiving chamber a liquid to be filtered, means for introducing into said receiving chamber a gas under pressure, a plurality of horizontally-disposed partitions within said filtrate chamber whereby the latter is divided into a plurality of compartments one above the other, and a closable outlet from each of said compartments.

6. In a filter tank, the combination of a cylindrical inclosing shell, a vertically-disposed cylindrical filtering medium spaced inwardly from said shell, whereby a receiving chamber is formed within said filtering medium and an annular filtrate chamber is formed between said filtering medium and said shell, means for introducing into said receiving chamber a liquid to be filtered, means for introducing into said receiving chamber a gas under pressure, a plurality of horizontally-disposed partitions within said filtrate chamber each of said partitions sloping downwardly from said filtering medium to said shell, whereby said filtrate chamber is divided into a plurality of compartments one above the other, and a closable outlet from the lower portion of each of said compartments.

7. In a filter tank, the combination of a vertically-disposed cylindrical inclosing shell having top and bottom closing members therefor, a perforated inner shell spaced inwardly from said inclosing shell, a filtering medium located adjacent to the inner surface of said perforated shell, whereby a receiving chamber is formed within said filtering medium and a filtrate chamber is formed between said perforated shell and said outer shell, means for introducing into said receiving chamber a liquid to be filtered, means for introducing into said receiving chamber a gas under pressure, a plurality of horizontally-disposed partitions between said perforated shell and said outer shell, whereby said filtrate chamber is divided into a plurality of compartments one above the other, and a closable outlet from each of said compartments.

8. In a filter tank, the combination of a vertically-disposed cylindrical inclosing shell having top and bottom closing members therefor, a perforated inner shell spaced inwardly from said inclosing shell, a filtering medium located adjacent to the inner surface of said perforated shell, whereby a receiving chamber is formed within said filtering medium and a filtrate chamber is formed between said perforated shell and said outer shell, means for introducing into said receiving chamber a liquid to be filtered, means for introducing into said receiving chamber a gas under pressure, a plurality of horizontally-disposed partitions between said perforated shell and said outer shell, whereby said filtrate chamber is divided into a plurality of compartments one above the other, said partitions sloping downwardly from said perforated inner shell to said outer shell, and a closable outlet from each of said compartments.

In witness whereof, I hereunto subscribe my name this 25 day of October, A. D., 1915.

BRUNO RICHARD KOERING.

Copies of this patent may be obtained for five cents each, by addressing the "Commissioner of Patents, Washington, D. C."